June 1, 1943.  R. F. SMART  2,320,804
SHADE ROLLER BRACKET
Filed Nov. 19, 1942
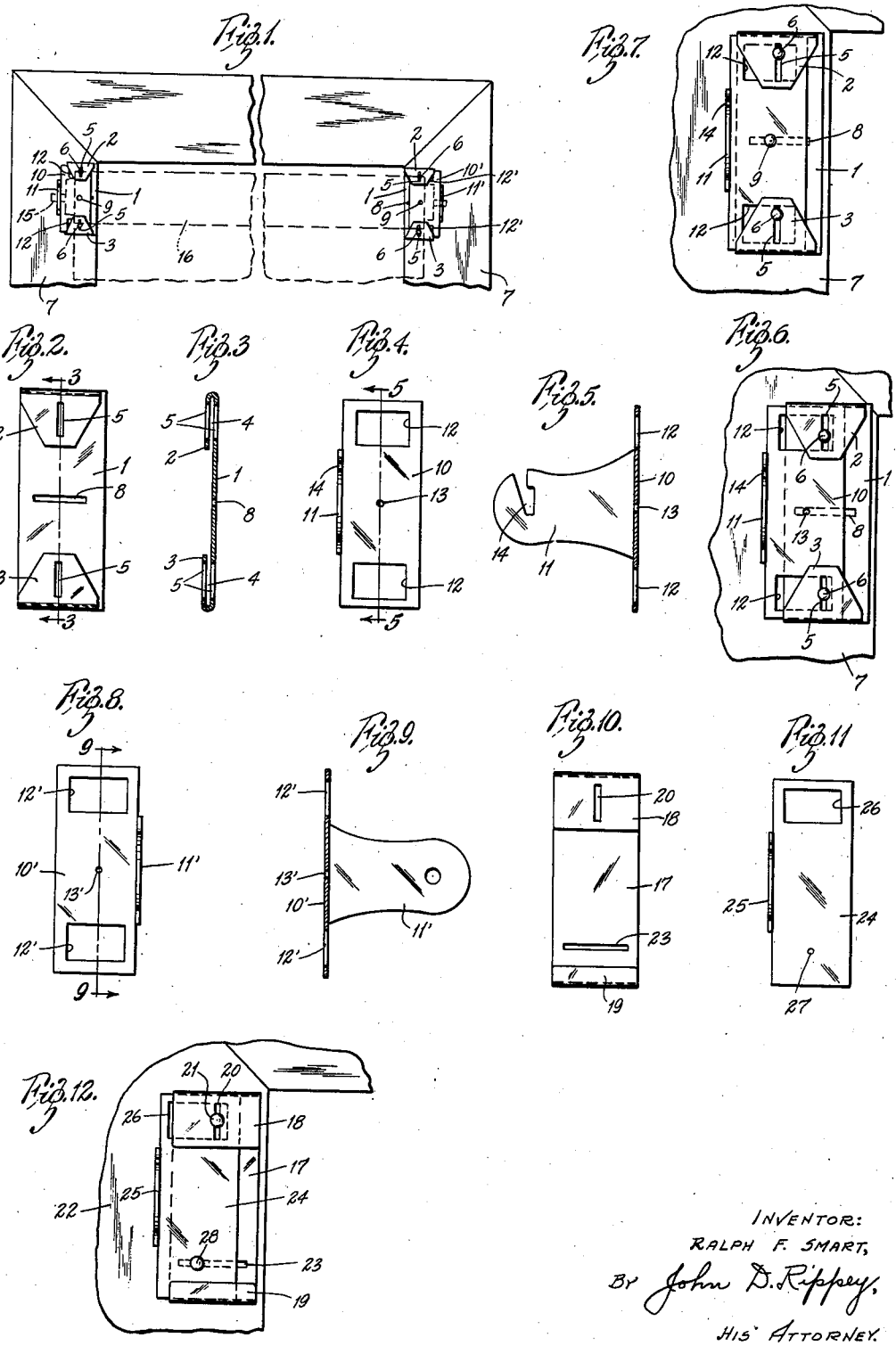
INVENTOR:
RALPH F. SMART,
By John D. Rippey,
HIS ATTORNEY.

Patented June 1, 1943

2,320,804

UNITED STATES PATENT OFFICE 2,320,804

SHADE ROLLER BRACKET

Ralph F. Smart, St. Louis, Mo.

Application November 19, 1942, Serial No. 466,128

4 Claims. (Cl. 248—270)

This invention relates to shade roller brackets, and has special reference to brackets adapted to be attached to window frames or the like for supporting the usual shade rollers.

Objects of the invention are to provide a pair of brackets composed of sheet metal or the like for supporting the opposite ends of a shade roller and consisting of duplicate reversible and interchangeable bracket plates adapted to be secured to or near opposite sides of a window frame, and each consisting of a vertically elongated thin sheet metal plate having its upper and lower ends bent and extended downwardly and upwardly toward each other and at least one of said ends provided with a vertically elongated and laterally narrow slot in the same plane with a slot through the body portion of the plate, said slots being adapted to receive a fastener driven into the window frame and permit vertical movement and adjustment of the bracket plate; to provide means whereby the bracket plate may be attached in its selected vertically adjusted position and permanently held and prevented from either vertical or lateral displacement; to provide a bracket for one end of the shade roller mounted for lateral sliding movements on said plate and having its upper and lower ends engaged in spaces or grooves between the downwardly and upwardly turned ends and the body of said plate and provided with at least one vertically wide and laterally elongated slot in direct registration with said slots in said plate to permit lateral adjustment of the bracket on and relative to the plate and also to permit vertical adjustment of the plate and bracket together while the fastener extends through said slots and is engaged in the window frame; and to provide a complementary bracket for connection with and adjustment on the companion plate, thereby permitting relative vertical adjustment of the plates and brackets, and also permitting relative lateral adjustments of the brackets on said respective plates.

Another object of the invention is to provide improved shade roller brackets composed preferably of sheet metal and constructed so that they may be easily adjusted in different relative vertical and lateral positions.

Other objects of the invention will be apparent from the following description, reference being made to the annexed drawing, in which—

Fig. 1 is a broken front view of the upper portion of a window frame showing a pair of my improved adjustable shade roller brackets attached thereto.

Fig. 2 is an enlarged front elevation of one form of bracket plate made in accordance with the present invention.

Fig. 3 is a vertical longitudinal sectional view of the bracket plate on the line 3—3 of Fig. 2.

Fig. 4 is a front elevation showing one of the brackets proper detached from the supporting bracket plate.

Fig. 5 is a vertical sectional view of the bracket proper on the line 5—5 of Fig. 4.

Fig. 6 is a front elevation showing the plate of Fig. 2 and the bracket of Fig. 4 assembled and partially attached to a support such as a window frame, for vertical adjustment together and relative lateral adjustment of the bracket on the plate.

Fig. 7 is a view similar to Fig. 6 and showing the bracket and supporting plate permanently and finally attached to the window frame in their final adjustments.

Figs. 8 and 9 are views complementary to Figs. 4 and 5 showing the other bracket proper of the pair of brackets that are made for attachment to either bracket plate.

Fig. 10 is a front elevation showing a modified form of bracket plate.

Fig. 11 is a front elevation analogous to Fig. 4, showing a modified form of bracket proper for attachment to the plate shown in Fig. 10.

Fig. 12 is a front elevation showing the plate of Fig. 10 and the bracket of Fig. 11 assembled together and attached to a supporting window frame.

According to one form of the invention, the bracket supporting plate is made of sheet metal and comprises a vertically elongated thin body 1 having its upper end portion 2 bent downwardly and its lower end portion 3 bent upwardly toward each other. Said end portions 2 and 3 are in substantially the same vertical plane, parallel with the body 1 of the plate, and separated from said body by distances approximately equal to the thickness of the base of the bracket proper. This provides grooves or spaces 4 between the body 1 and the ends 2 and 3 adapted to receive the end portions of the bracket proper.

In this form of bracket plate, matching vertically elongated and laterally narrow slots 5 are formed through the body 1 and the ends 2 and 3 adapted to receive fasteners 6 extended through said slots and into the sides of the window frame 7. It will be seen that when the fasteners 6 are only partially driven into the window frame 7, the supporting plate may be moved vertically to different adjusted positions, as should be understood by a comparison of Figs. 6 and 7, which show the bracket plate in different vertical adjustments. This form of bracket plate is capable of vertical adjustment on the fasteners 6 which prevent lateral adjustment or displacement of said plate.

A laterally elongated and vertically narrow slot 8 is formed through the body 1 of the bracket plate between the end portions 2 and 3, and is adapted to receive a fastener 9 cooperating with the fasteners 6 to support the composite bracket and prevent relative lateral displacement of the bracket proper on the plate.

The bracket proper for supporting one end of the window shade roller consists of a section of sheet metal preferably of the same gage as the bracket plate, and includes an elongated base 10 and a forwardly or outwardly extended arm 11 integral with and bent from one side edge of the base 10. The upper and lower ends of the base 10 extend into the spaces 4 so that the bracket proper is laterally adjustable on the base. This form of bracket has vertically elongated and laterally wide slots 12 in its upper and lower ends which register with the vertically elongated and laterally narrow slots 5 when the bracket proper is connected with the plate and the upper and lower ends of the base 10 are engaged in the spaces or grooves 4. The vertical length of the slots 12 should be at least equal to the vertical length of the slots 5; and the lateral width of said slots 12 may be much greater than or many times the lateral width of the slots 5, as shown. The base 10 is also formed with a hole 13 which registers with the slot 8 when the bracket proper is mounted on the supporting plate with the upper and lower ends of the base 10 engaged in the spaces or grooves 4. The forward end of the arm 11 is provided with the usual notch or slot 14 for receiving the usual flat spring trunnion 15 extended from one end of the shade roller 16.

The companion or complementary bracket is made from the same type of thin sheet metal as the bracket proper just described, including a base 10' having a forwardly extended arm 11' formed integral with one vertical side edge thereof. The upper and lower ends of the base 10' are adapted to be engaged in the spaces or grooves 4, placing the slots 12' in registration with the slots 5 for receiving fasteners 6. This will permit vertical adjustment of the bracket plate together with the bracket proper, and will also permit relative lateral adjustment of the bracket proper on the plate, so that either bracket assembly may be adjusted relative to the other bracket assembly as required to support the shade roller 16 horizontally, and also to receive the shade roller between the arms 11 and 11' of the two supporting brackets. The base 10' is formed with a hole 13' adapted to register with the slot 8 and receive the fastener 9 after the bracket proper has been adjusted in the desired lateral position on the supporting plate.

After the bracket assembly has been adjusted in the proper vertical position, and after the bracket proper has been adjusted in the desired lateral position on the supporting plate, the fasteners 6 and 9 are driven in to attach the parts rigidly together and to the window frame and hold the parts from vertical or lateral displacement.

Fig. 10 shows a modified form of bracket plate made of thin sheet metal or the like, and comprising a vertically elongated body 17 having its upper end portion 18 bent downwardly and its lower end portion 19 bent upwardly toward each other. Said end portions 18 and 19 are approximately in the same vertical plane, parallel with the body 17 of the plate, and separated from said body by distances approximately equal to the thickness of the base of the bracket proper. This provides grooves or spaces for receiving the end portions of the base of the bracket proper.

In this modified form of bracket plate, matching vertically elongated and laterally narrow slots 20 are formed through the body 17 and the end 18 adapted to receive a fastener 21 extended through said slots and into the window frame 22. In this form of the invention, the end portion 19 is of considerably less length than the length of the end portion 18, and is not long enough to receive and does not have any slot 20 therein. In this particular, the supporting plate 17 is diffeernt from the supporting plate 1 in which both ends 2 and 3 are provided with slots 5. The plate 17 is provided with a laterally elongated and vertically narrow slot 23 between the bent ends 18 and 19 and adjacent to the end 19.

Each bracket proper for this modified form of supporting plate consists of a section of sheet metal preferably of the same gage as the bracket plate and including a vertically elongated base 24 and a forwardly and outwardly extended arm 25 integral with and bent from one side edge of said base 24. The ends of the base 24 extend into the spaces or grooves provided between the plate 17 and the bent ends 18 and 19 of said plate, and are laterally adjustable relative to said plate. The base 24 has near one end a vertically elongated and laterally wide slot 26 adapted to register with the slots 20 when the bracket proper and the support therefor are assembled; and also has a hole 27 registering with the slot 23 in any lateral adjustment of the bracket on the supporting plate. This permits a fastener 28 to be passed through the hole 27 and the slot 23 and driven into the window frame 22 to prevent lateral displacement of the bracket proper on the supporting plate and to prevent vertical movement of the assembled supporting plate and bracket on the window frame 22. The fastener 21 prevents lateral displacement of the supporting plate 17 and thereby cooperates with the fastener 29 to hold the assembled bracket and plate from displacement in any direction.

The construction of the complementary bracket for supporting the opposite end of the shade roller 16 is the same as that shown in Figs. 11 and 12 and above described, with the exception that the arm 25 is extended from the opposite vertical side edge of the base 24, as in the construction of the two complementary brackets first described.

From the foregoing, it is apparent that these improved brackets may be made of relatively thin sheet metal or the like, and that the reversible and interchangeable bracket plates may be secured to or near opposite sides of a window frame; that the bracket supporting plates are of duplicate construction, are reversible and interchangeable, and are adapted to support either of the brackets proper. Either form of the invention permits both bracket assemblies to be adjusted vertically relative to each other without withdrawing or detaching the partially driven-in fastener, such as either of the fasteners 6 or the fastener 21. It also permits relative lateral adjustment of the brackets proper on their respective supporting plates so long as the fasteners 6 or 21 are not completely driven-in. In the form of the invention first described, the fastener 9 prevents vertical displacement of the bracket assembly while the fasteners 6 cooperate therewith to prevent lateral displacement of either bracket assembly. In the construction shown in Figs. 10, 11 and 12, the fastener 29 prevents vertical displacement of the bracket assembly and cooperates with the fastener 21 to prevent lateral displacement.

The form of the invention may be varied in other particulars without departure from the nature and principle thereof.

I claim:

1. A shade roller bracket comprising a supporting plate composed of a section of sheet metal having its upper and lower ends extended toward each other forwardly beyond the plate and providing transverse grooves between said ends and the body of said section, and having a vertically elongated and laterally narrow slot through at least one of said ends and through the adjacent portion of said section at the opposite side of said groove and also having a vertically narrow and laterally elongated slot beyond the end in which said first slot is formed; a bracket composed of sheet metal and including a base having its ends slidable transversely in said grooves and having a relatively elongated and wide slot registering with said first slot and leaving said bracket and said plate vertically adjustable together and as a unit and also leaving said bracket laterally adjustable on said plate when a fastener extends through the two first slots, and also having a hole registering with said last named slot in said plate for receiving a fastener preventing vertical movement of said bracket and said plate together as a unit and also preventing relative lateral adjustment of said bracket on said plate.

2. A shade roller bracket comprising a supporting plate composed of sheet metal having its upper and lower ends extended toward each other forwardly beyond the plate and cooperating with said plate to form transverse grooves, and having a vertically elongated and laterally narrow slot through both of said ends and through adjacent portions of said plate at the opposite sides of said grooves, and also having a vertically narrow and laterally elongated slot between said ends; a bracket including a base having its ends slidable transversely in said grooves and provided with a relatively elongated and wide slot adjacent to each end and registering with said respective slots in said plate, leaving said bracket and said plate vertically adjustable together as a unit and leaving said bracket laterally adjustable on said plate when fasteners extend through said slots in said ends and in said base, and also having a hole registering with said last named slot in said plate for receiving a fastener preventing vertical movement of said bracket and said plate together as a unit and also preventing relative lateral movement of said bracket on said plate.

3. A shade roller bracket comprising a supporting plate composed of a section of sheet metal having one end extended approximately parallel with said plate and providing a transverse groove between said end and said plate, and having the opposite end extended toward said first end parallel with said plate and providing a complementary groove, said plate having a vertically elongated and laterally narrow slot therethrough adjacent to one of said grooves, and also having a vertically narrow and laterally elongated slot between said grooves; a bracket including a base having its ends slidable transversely in said grooves and having a vertically long and laterally wide slot registering with said vertically elongated and laterally narrow slot in said plate and leaving said bracket and said plate vertically adjustable together as a unit and also leaving said bracket laterally adjustable on said plate when a fastener extends through said registering slots, and also having a hole registering with said last named slot in said plate for receiving a fastener preventing vertical movement of said bracket and said plate together as a unit and also preventing relative lateral adjustment of said bracket on said plate.

4. A shade roller bracket comprising a support having transverse grooves at its upper and lower ends and having a vertically elongated and laterally narrow slot adjacent to one of said grooves and also having a vertically narrow and laterally elongated slot between said grooves; a bracket including a base having its ends slidable transversely in said grooves and having a vertically long and laterally wide slot registering with said first slot and leaving said bracket and said plate vertically adjustable together as a unit and also leaving said bracket laterally adjustable on said plate when a fastener extends through said registering slots, and also having a hole registering with said last named slot for receiving a fastener to prevent vertical movement of said bracket and said plate together as a unit and also to prevent relative lateral adjustment of said bracket on said plate.

RALPH F. SMART.